INVENTOR:
CURTISS L. COOK
ATTORNEYS.

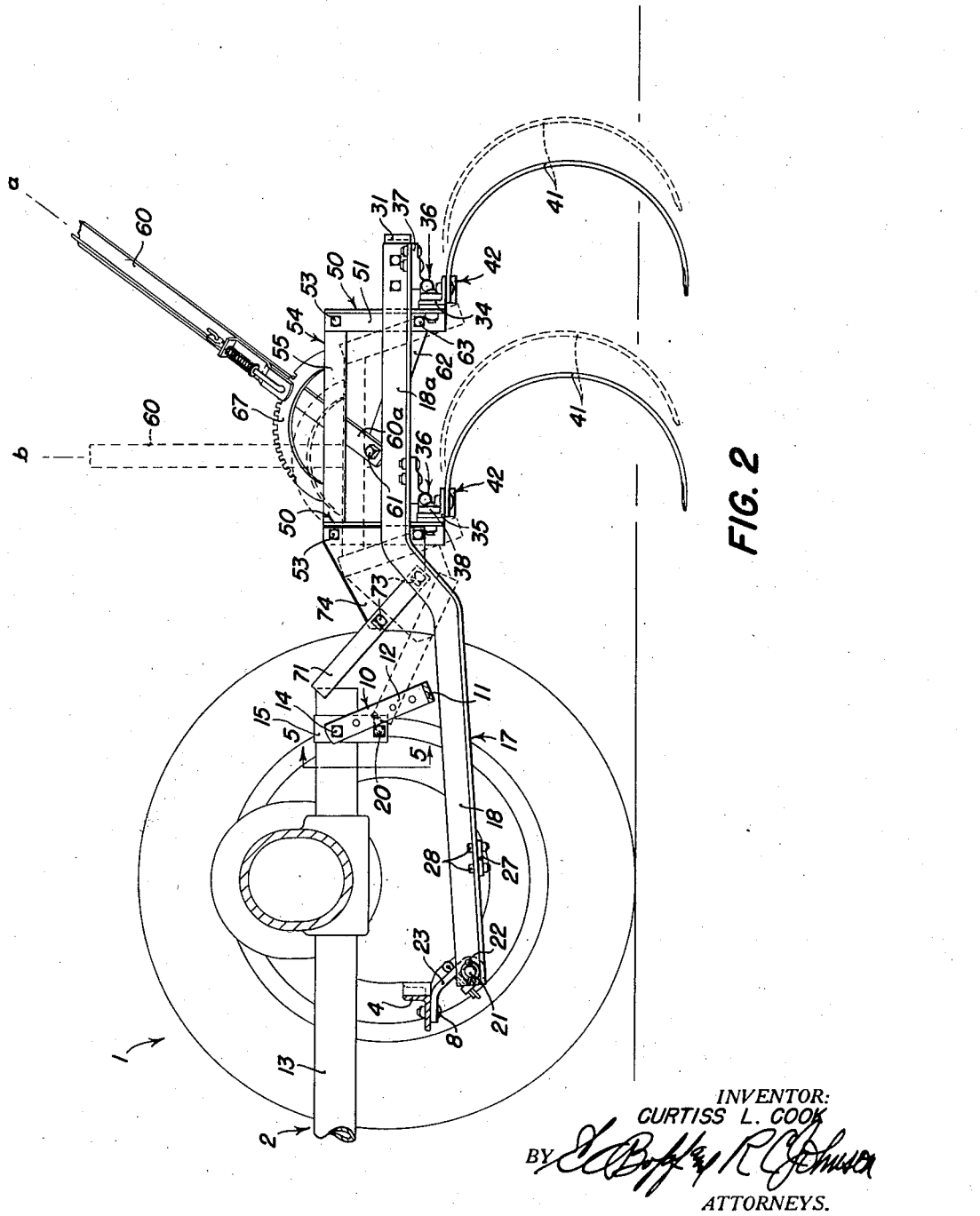

Nov. 24, 1942.  C. L. COOK  2,302,842
SPRING TOOTH HARROW
Filed Oct. 31, 1940  4 Sheets-Sheet 3
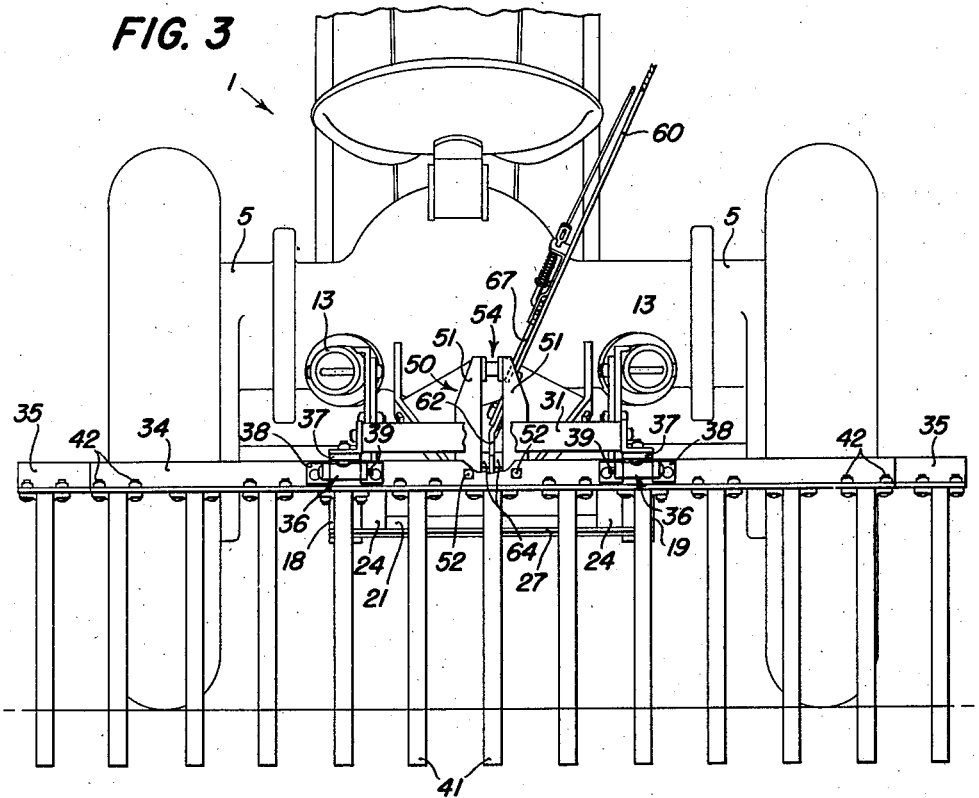
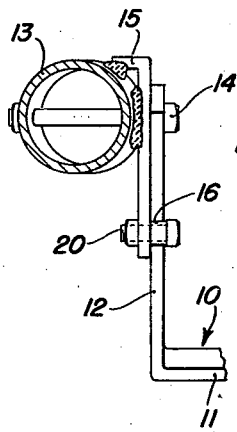
INVENTOR:
CURTISS L. COOK
ATTORNEYS.

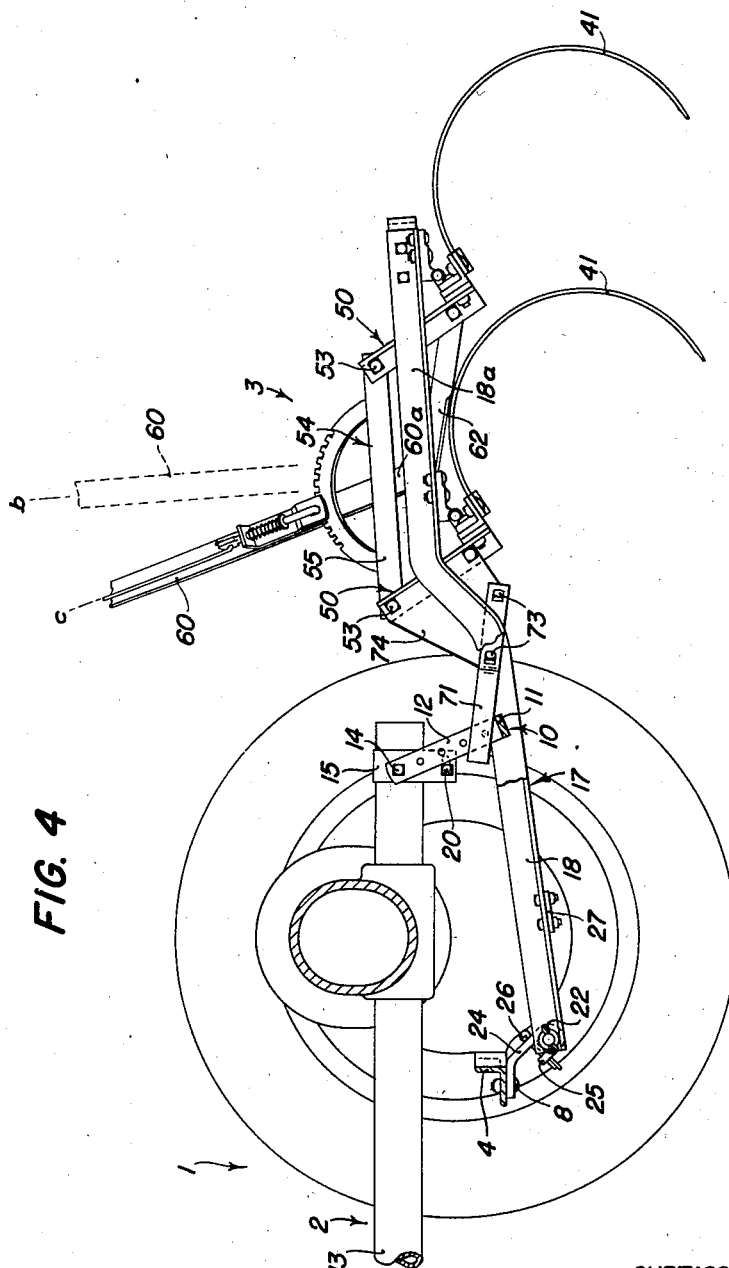

Patented Nov. 24, 1942

2,302,842

UNITED STATES PATENT OFFICE 2,302,842

SPRING TOOTH HARROW

Curtiss L. Cook, Syracuse, N. Y., assignor to Syracuse Chilled Plow Company, Inc., Syracuse, N. Y., a corporation of New York Application October 31, 1940, Serial No. 363,587

25 Claims. (Cl. 55—92)

The present invention relates generally to agricultural implements and more particularly to soil working tools of the type adapted to be connected with and, when in transport, supported on a tractor.

The object and general nature of the present invention is the provision of a tractor harrow of the integral type which is provided with means operative through one range for adjusting the operating position of the harrow teeth and operative through another range for raising the harrow out of contact with the ground and into a transport position supported on the tractor. Further, it is a feature of this invention to provide a single lever so constructed and arranged as to serve both to adjust the operating position of the harrow teeth and to raise the harrow into its transport position. Preferably, according to the present invention, the lever is disposed adjacent the operator's seat on the tractor but disposed in an upwardly and outwardly inclined plane so as to clear the tractor seat at all times.

More specifically, it is a feature of this invention to provide an integral harrow having rockable tooth bars, with arm means rockable with the tooth bars at all times, so disposed that during the depth adjusting movements of the tooth bars said arm means remain out of contact with the tractor, but when the adjusting means has been swung into another position said arm means engages a part on the tractor and reacts thereagainst to raise the entire harrow frame, together with the tooth bars and harrow teeth, into their transport position. In this connection, it is a further feature of this invention to provide improved connecting means between the front end of the harrow frame and the tractor so that the implement may be attached or detached quickly and easily without loss of time. In this connection it is particularly an important feature of this invention to arrange the arm means so that merely by engaging the part of the tractor the harrow may be lifted into transport position, yet the arm means is separated from the tractor merely by moving the latter away from the implement, since the arm means is not otherwise connected to the tractor. Thus, it is necessary, in connecting or detaching the implement, only to connect or detach the front hitch connection.

It is also a feature of this invention to provide means whereby the means that engages the tractor when lifting the harrow contacts the tractor at laterally separated points so that when in transport position the harrow frame is supported in a sturdy manner.

These and other objects and advantages of the present invention will be apparent to those skilled in the art after a consideration of the following detailed description taken in conjunction with the accompanying drawings which illustrate the preferred form of the invention.

In the drawings:

Figure 2 is a side view of the implement shown in Figure 1;

Figure 3 is a rear view of the implement shown in Figures 1 and 2;

Figure 4 is a view similar to Figure 2, showing the harrow in raised position in which the harrow is supported entirely on the tractor for transport; and Figure 5 is a fragmentary view taken generally along the line 5—5 of Figure 1, showing the means for holding the tractor drawbar support member in the proper position to receive the harrow lifting arms.

Figure 1:
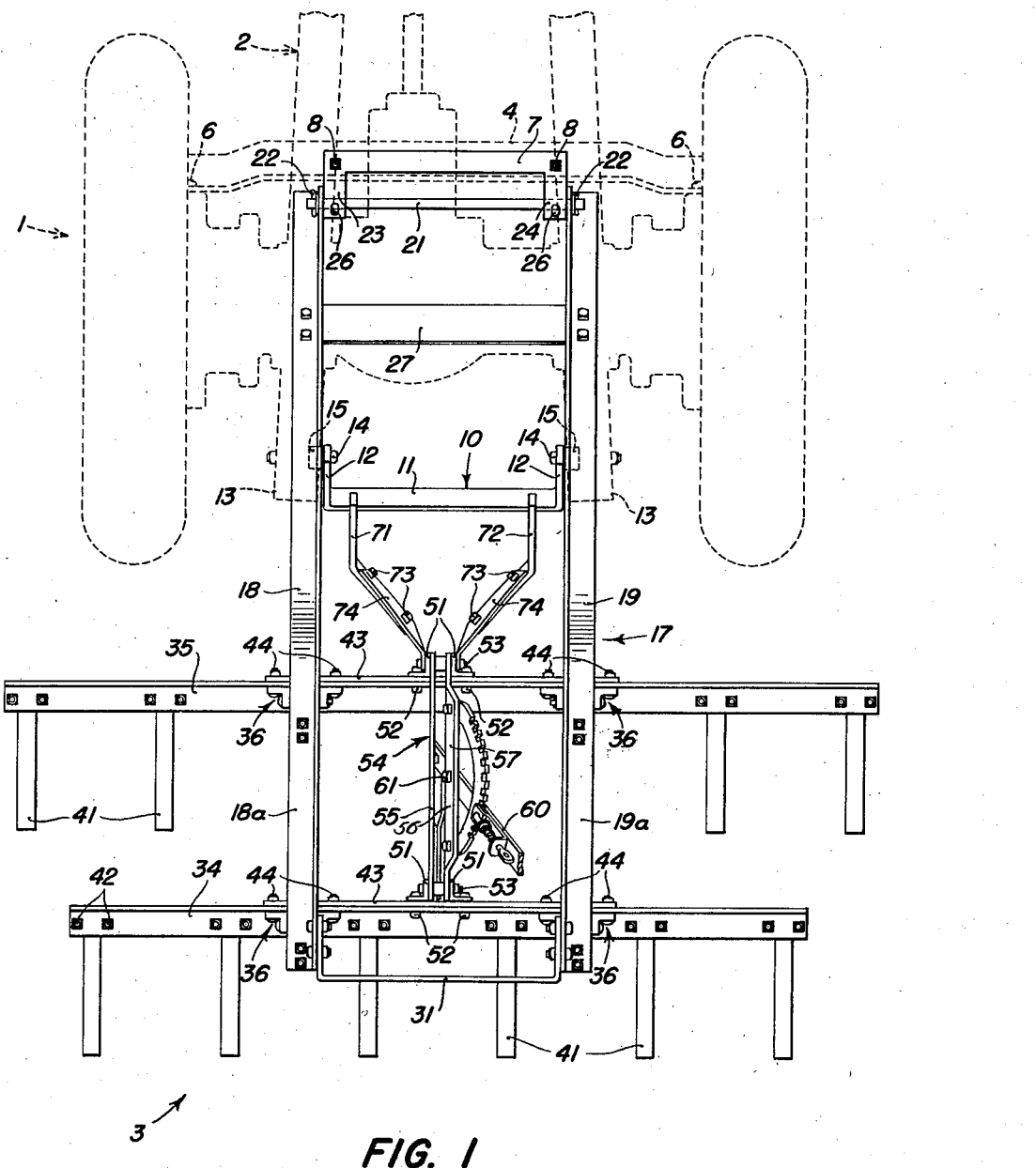
Figure 1 is a plan view of a spring tooth harrow in which the principles of the present invention have been incorporated, showing the harrow attached to the tractor that propels it and in operating position.

Referring now more particularly to Figures 1–3, the reference numeral 1 indicates in its entirety a farm tractor which includes a frame 2 having frame bars 13 and which serves as a supporting and propelling frame means for the implement. The harrow is indicated in its entirety by the reference numeral 3 and is of the integral type, that is, it is connected directly to the tractor and supported on the tractor when in transport. The tractor 1 includes a transverse drawbar 4 fixed to the tractor 1 in any suitable manner, preferably to the rear axle drive housings 5 by cap screws 6. Preferably, the tractor drawbar 4 is in the form of an angle bar having apertures to which the draft bar 7 of the harrow 3 is secured, as by bolts 8. The tractor 1 also includes a rear drawbar support member 10, the latter including a central section 11 and upturned ends 12, both being provided with a plurality of apertures. Normally, the drawbar support member 10 is connected to the rear frame bars 13 of the tractor by means of studs or bolts 14, on which, according to the present invention, the member 10 is swung. The bolts 14 are carried by drawbar support brackets 15 that are fixed to the tractor frame bars 13 in any suitable manner, such as welding or the like. A spacer 16 is fixed by a bolt 20 to each bracket 15 below the bolt 14 for the purpose of holding the member 10 in the position best shown in Figures 4 and 5.

The frame of the harrow 3 is indicated by the reference numeral 17 and comprises two bars 18 and 19, preferably of angle iron construction, extending generally longitudinally of the tractor when the harrow is attached thereto. The forward ends of the frame bars 18 and 19 are apertured to receive a transverse rod 21 which serves as the drawbar of the harrow. The ends of the harrow drawbar 21 are apertured to receive cotter keys 22 or the like for holding the rod in position. The latter is adapted to be engaged over a pair of downwardly and rearwardly extending draft hooks 23 and 24 which are welded to the member 7. The draft hooks 23 and 24 are formed with ends bent upwardly, as at 25, so that the harrow draft rod 21 may easily be engaged therein. Cotter pins 26 are used to retain the draft rod 21 in the harrow draft member 7. The front portions of the frame bars 18 and 19 are reenforced by a cross brace 27 which is bolted, as at 28 to the horizontal flanges of the frame bars.

The rear portions of the frame bars are formed as upwardly offset sections 18a and 19a, the rear ends of which are connected together by a transverse strap 31 having forwardly bent ends bolted to the vertical legs of the frame bars at their rear ends. A pair of transverse tooth bars 34 and 35 are pivotally connected to the rear sections 18a and 19a of the harrow frame by means of hinges 36, each preferably consisting of a leaf 37 fixed to the horizontal flange of the associated frame bar and a leaf 38 fixed to the vertical flange of the tooth bar, with a pintle 39 extending through apertured lugs formed on the leaves 37 and 38. In this way the tooth bars 34 and 35 are mounted for pivotal or rocking movement at the rear of the harrow frame below the frame bars 18 and 19. Each tooth bar receives a plurality of harrow teeth 41 clamped to the horizontal flanges of the tooth bars for adjustment to different lateral positions thereon, so as to vary the tooth spacing, by bolts and clips, as indicated at 42, and the hinges 36 are such that the tooth bars 34 and 35 are far enough below the frame bars 18 and 19 that some of the teeth 41 and their clamps 42 may, if necessary to secure the desired spacing, be disposed directly underneath either or both of the frame bars 18 and 19. Each tooth bar is reenforced at the middle section by a transverse strap 43 that extends laterally outwardly slightly beyond the bolts 44 connecting the pivot hinges 36 to the tooth bars, the bolts 44 serving also to fix the reenforcing bar 43 in position.

The harrow 3 is equipped with mechanism, including a single hand lever, for adjusting the penetration and also raising the harrow relative to the tractor into its transport position. Such mechanism will now be described.

An arm 50 is fixed to each tooth bar generally in the central portion thereof, and each arm consists of a pair of angle members 51 which are bolted, as at 52, at their lower ends to the vertical flange of the associated tool bar. The upper ends of the arm members 51 are apertured to receive a pivot bolt 53, and secured to the pivot bolts 53 is a link member 54 that consists of a pair of straps 55 and 56 extending generally longitudinally of the harrow. The left hand strap 55 is disposed generally in a vertical plane, but the right hand strap 56 includes a section 57 that is bent laterally outwardly so as to lie in a plane that extends upwardly and laterally outwardly. A hand lever 60 is pivoted, as at 61, to the link section 57 and has its lower end 60a apertured to receive the forward end of a link 62, the rear end of which is pivotally connected by a pivot bolt 63 and suitable spacers 64 to the rear arm members 51 relatively close to the rear tooth bar 34, and also relatively close to the transverse pivot axis of the rear tooth bar. It will be noted that the lower end 60a of the hand lever is relatively short compared to the length of the tooth bar arms 50. This provides the necessary mechanical advantage to ensure an easy lift. The link section 57, to which the hand lever 60 is pivoted, carries a sector 67 which is disposed in the above-mentioned upwardly and laterally outwardly disposed plane, and the hand lever 60 carries suitable latch mechanism cooperating with the notched sector 67 so that the lever 60 may be held in different positions. The purpose of having the hand lever 60 and associated parts disposed in an upwardly and laterally outwardly angled plane is to have the hand lever 60 clear the seat of the tractor, yet be in a position closely adjacent thereto so that the operator will be able both to adjust the operating depth and to raise the harrow from the tractor seat, as shown in Figures 2 and 3.

As best shown in Figure 2, movement of the hand lever 60 through the range a—b reacts through the link 62 against the harrow frame to swing the harrow teeth into different operating positions for varying the penetration. Continued movement of the hand lever 60 through the range b—c (Figure 4) serves to raise the entire harrow relative to the tractor by means of mechanism which will now be described.

A pair of lifting arms 71 and 72 are bolted, as at 73, at their rear ends to a pair of plates 74 which serve as lifting arm supports. The rear portions of the lifting arm supports are fixed rigidly to the arm members 51 of the front angling arm 50 by the bolts 53 and 63 so that whenever the forward tooth bar 35 rocks on its pivotal support, the lifting arms 71, 72 swing in a generally vertical direction. As best shown in Figure 1, the forward ends of the lifting arms 71 and 72 overlie the tractor drawbar support 10 when the harrow is connected to the tractor. Thus, when the hand lever 60 is rocked through the range b—c (Figure 4) the ends of the lifting arms 71 and 72 engage and react against the drawbar support 10 of the tractor and raise the entire harrow into its transport position where it is supported entirely on the tractor. Normally, as best shown in Figure 2, when the harrow is in operating position, that is, whenever the hand lever 60 is in any position within the operating range a—b, the ends of the lifting arms 71 and 72 are disposed with adequate clearance above the tractor drawbar support 10 so that the harrow may move up and down, that is, float, relative to the tractor, since in operating position the only connection between the harrow and the tractor is at the harrow draft rod 21. It may be considered, therefore, that the arms 71, 72 and associated parts constitute a lost motion or one-way connection between the rear portion of the harrow and the tractor so that during the lifting range of the depth adjusting means the latter takes up the lost motion and raises the implement relative to the tractor, which thus forms supporting frame means or propelling means therefor. The spacers 16 hold the member 10 in a position to prevent excessive depth when operating in very loose soil conditions and also to reduce the lifting effort when raising the implement to transport position. Further, by disposing the member 10 angled rearwardly, it can swing upwardly if in operating over uneven ground the harrow should be forced upwardly relative to the tractor in such a position as to strike the member 10.

The operation of the implement described above is substantially as follows:

When in operating position the hand lever 60 is movable through the range a—b, the minimum penetration being obtained when the lever is in vertical position as shown in dotted lines in Figure 2. Moving the hand lever 60 rearwardly gives port 10 to raise the entire unit in relaure 2. Thus, the penetration or depth of operation desired is obtained by rotation of the tooth bars, no depth shoes being used or required. When the hand lever 60 is swung forwardly, into the range b—c, forwardly of its vertical position, the lifting arms 71, 72 engage the drawbar support 10 to raise the entire unit in relation to the tractor. The spacers 16 hold the drawbar support 10 in the proper position to receive the lifting arms 71 and 72 when raising the harrow. By virtue of the fact that the lifting connection between the harrow and the tractor is merely one of engagement or contact, the attachment and detachment of the harrow is a relatively simple operation. To attach the harrow, all that it is necessary to do is to bolt the harrow drawbar 7 to the angle drawbar 4 of the tractor with the hooks 23 extending backwardly and downwardly, after having first removed the tractor swinging drawbar (not shown). With the depth adjusting lever 60 in its rear position the harrow will support itself on the harrow teeth 41, and will facilitate backing the tractor in position over the forward portion of the harrow frame. It is then a simple matter to engage the harrow draft rod 21 in the hooks 23, 24 and insert the holding cotter pins 26. Preferably, before backing the tractor over the harrow, the tractor drawbar support is adjusted to the lower position and the spacers 16 installed so as to hold the tractor drawbar support in about the position shown in Figure 4. When disconnecting the harrow, the operations mentioned above are reversed, and if desired, the harrow drawbar member 7 may be left attached to the tractor when disconnecting the harrow, provided its presence on the tractor does not interfere with subsequent use of the tractor. It will be seen, particularly from Figure 1, that the lifting arms 71 and 72 are spaced apart a substantial distance at the points where they engage the tractor drawbar support 10. This provides for a laterally rigid support of the harrow on the tractor when in raised or transport position. This rigid support of the harrow when transporting is further augmented by the use of the rigid lifting arm supporting plates 74.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising two frame means interconnected for movement one relative to the other, a tool movably mounted on one frame means, means on said one frame means for moving said tool to adjust the depth of operation, and means movable with said adjusting means and adapted to engage the other of said two frame means whereby continued movement of said adjusting means reacts against said other frame means to raise said tool into inoperative position entirely out of contact with the ground.

2. An agricultural machine comprising means serving as a frame, tool means movably connected therewith, propelling means to which said frame means is connected for movement about a pivot axis forward of said tool means, means on said frame means for adjusting the position of said tool, and means movable with said adjusting means and engageable with said propelling means at a point rearwardly of said axis whereby said adjusting means may be utilized for raising said tool means relative to said propelling means about said axis out of contact with the ground.

3. An agricultural implement comprising a supporting frame, an implement frame connected therewith for generally vertical movement, adjustable means swingably mounted on the implement frame, a tool movably carried by said implement frame and operatively connected with said adjustable means whereby movement of the latter adjusts the operating position of said tool, and means on the implement frame connected with said adjustable means and including laterally spaced sections engageable with said supporting frame at laterally spaced points for supporting said implement frame and said tool in inoperative position.

4. An agricultural implement comprising a supporting frame, an implement frame connected therewith for generally vertical movement, tool means carried by said implement frame and including a transverse tool bar rockably supported by said implement frame, a pair of arms connected with said tool bar, and means for rocking the latter to adjust the position of said tool means, said pair of arms engaging said supporting frame at laterally spaced points in one position of said tool bar whereby said implement frame and associated tool means may be held in transport position by said supporting frame.

5. A tractor harrow comprising a harrow frame movably connected with the tractor for generally vertical swinging movement, a transverse tool bar rockably connected with said implement frame and including a plurality of harrow teeth connected to the tool bar, means for rocking said tool bar to adjust the operating position of said teeth, said adjusting means being movable through two ranges, one for adjusting said teeth and the other for raising the implement frame relative to the tractor, and means connected with said adjusting means and engageable with the tractor for lifting said implement frame when said adjusting means moves through said other range of movement.

6. An agricultural implement comprising a supporting frame, an implement frame pivotally connected at its forward end with said supporting frame for generally vertical swinging movement, arm means pivotally mounted on said implement frame adjacent the rear thereof, tool means connected with said arm means for movement therewith, and means for moving said interconnected arm means and tool means, said tool means and arm means being so angularly related that in the operative position of said tool means said arm means is disposed above the adjacent rear portion of said supporting frame so as to provide for movement of said implement frame relative to the supporting frame, operation of said moving means acting through said arm means when the latter engages said supporting frame for raising said implement frame and the tool means connected therewith about the pivot axis at the forward end of said implement frame.

7. The combination with a tractor having a transverse drawbar support, of an implement frame pivotally connected with said tractor for generally vertical swinging movement about an axis spaced in a fore and aft direction from said drawbar support, and rockably mounted means disposed on said implement frame in a position to engage said drawbar support on the tractor and raise the implement frame relative to the tractor.

8. A tractor harrow comprising a frame connected with the tractor for movement relative thereto about a pivot axis, tooth bar means rockably mounted on said frame and having teeth connected therewith, means for rocking said tooth bar means through a given range to adjust the operation of said teeth, and means operable by movement outside said range and reacting against the tractor at a point spaced from said axis for raising said frame and teeth out of operating position.

9. A quick detachable tractor harrow of the integral type comprising a harrow frame adapted to be pivotally connected directly to the tractor, and lifting means including a rigid part pivotally mounted on the implement frame and overlying a portion of the tractor but normally spaced vertically therefrom, said part being arranged so that the disposition of said harrow frame in a position to be pivotally connected with the tractor disposes said part in a position over the adjacent portion of the tractor, said part being engageable with the tractor by contact alone, when said part is pivoted in one direction relative to said implement frame, for raising the frame into transport position, said implement part being free to move upwardly out of contact with the tractor.

10. An agricultural implement comprising a tractor having a transverse member at the rear, an implement hitched to the tractor forward of said member, and means serving as a pair of rigid laterally spaced arms movably mounted on the implement and engageable with said transverse member for raising the implement.

11. A tractor harrow of the integral type comprising a harrow frame adapted to be pivotally connected adjacent its forward end with the tractor for floating movement relative thereto when in operation, a pair of tooth bars disposed transversely of and pivotally connected with said implement frame, arm means fixed to the forward tooth bar and swingable therewith in a position rearwardly of the pivot connection of the harrow frame with the tractor and adjacent the rear portion of the tractor, said arm means being disposed forward of said tooth bars, and adjusting and lifting means operatively connected with both of said tooth bars, said arm means being spaced above said rear portion of the tractor when the tooth bars are in operating position and engageable with and reacting against said rear portion of the tractor for raising the implement frame and tooth bars relative to the tractor.

12. A tractor harrow of the integral type comprising a harrow frame adapted to be pivotally connected at its forward end to the tractor generally forward of the tractor seat, a pair of transversely disposed tooth bars rockably connected with the rear portion of said harrow frame adjacent to and below said tractor seat, an arm fixed to the central portion of each tooth bar and extending upwardly therefrom, a link extending in a generally longitudinal direction and connecting said tooth bar arms, a portion of said link being disposed in an upwardly and laterally outwardly inclined plane, a sector carried by said portion of the link and disposed in said plane, an adjusting lever pivoted to said link and cooperating with said sector, said adjusting lever being also disposed generally in said plane and extending upwardly therein, the upwardly and laterally outward disposition of said lever serving to cause the latter to clear said seat, and means connecting said lever with said implement frame whereby rocking movement of said lever in said upwardly and outwardly angled plane serves to rock said tooth bars.

13. The combination with a tractor having means serving as a drawbar support at the rear thereof, of an implement frame pivotally connected with the tractor forward of the rear portion thereof for generally vertical swinging movement, arm means rockably mounted on said frame and extending generally forwardly thereof into a position to engage said drawbar support when rocked in one direction, means for rocking said arm means so as to act through the latter against said tractor drawbar support for raising said implement frame, and means for disposing said drawbar support in a position to receive said arm means.

14. In an agricultural machine, the combination of means serving as a supporting frame, an implement, quick detachable means connecting the implement with the supporting means for movement relative thereto, and means on the implement adapted to raise the implement relative to said supporting means solely by engagement with the latter in cooperation with said implement connecting means, said quick detachable means serving to dispose the implement raising means in a position above a part of said supporting means, whereby operation of said raising means moves the same into a position engaging and reacting against said supporting means to raise the implement relative thereto.

15. In an agricultural implement, a tractor, an implement having a frame and a generally forwardly and upwardly extending rockable member movably mounted thereon, means for rocking said member so as to swing the forward portion in a generally vertical direction, and means connecting the forward end of the implement frame and disposing the rocking member in a position above a part on the tractor when the rockable member is in an upper position at the time the implement frame is connected with the tractor, whereby movement of said rocking member in one direction swings the upper and forward portion of said member generally downwardly and causes it to engage said tractor part and raise the implement relative to the tractor, the upper position of said member serving to dispose the latter in a position to clear said tractor when attaching the implement thereto, whereby said connecting means serves as the sole means attaching the implement to the tractor.

16. A harrow comprising frame means including a frame bar, at least one transverse tool bar, downwardly disposed hinge means pivotally connecting the tool bar with said frame bar for swinging movement about an axis spaced below the frame bar, a tool and securing means adjustable along the tool bar for connecting said tool to the tool bar in different positions, said pivot axis being disposed far enough below the frame bar so that said securing means clears the lower edges of said frame bar, thereby providing for attachment of said tool substantially underneath said frame bar.

17. In an agricultural implement, a tractor, an implement having a frame and a member movably mounted thereon, said movable member comprising a generally forwardly extending section movable generally vertically, means for moving said member to shift said section generally vertically relative to said implement frame, and means connecting the forward end of said implement frame to the tractor in a position to dispose the forwardly extending section of said movable member in a position above a part on the tractor when said movable section is in an upper position at the time the implement frame is connected with the tractor, whereby subsequent movement of said movable member in one direction shifts the movable forwardly extending section generally downwardly and causes it to engage said tractor part and raise the implement relative to the tractor, the upper position of said movable member disposing said section in a position to clear the tractor when attaching the implement thereto, whereby said connecting means may serve as the sole means attaching the implement to the tractor.

18. An agricultural implement comprising a supporting frame, an implement frame connected therewith for generally vertical movement, tool means carried by said implement frame, and means on the latter including laterally spaced sections engageable with said supporting frame at laterally spaced points for supporting said implement frame and said tool in inoperative position.

19. An agricultural implement comprising a supporting frame, an implement frame connected therewith for generally vertical movement, tool means carried by said implement frame, means serving as a pair of generally laterally spaced fore and aft extending arms swingable on said implement frame and engageable with said supporting frame at laterally spaced points for supporting said implement frame and said tool means in inoperative position.

20. A tractor propelled implement of the integral type, comprising an implement frame including generally longitudinal frame bars, and means pivotally connecting the forward ends of said frame bars with the tractor for generally vertical swinging movement, said bars extending rearwardly underneath the rear portion of said tractor, a generally vertically shiftable member extending over a part at the rear of the tractor when the implement frame is connected with the latter, means movably connecting said member with the implement frame, and means for shifting said member generally downwardly to cause it to engage said tractor part, react against said implement frame and raise the latter about its connection at the forward end of said frame bars with the tractor.

21. A tractor propelled implement of the integral type, comprising an implement frame including a pair of generally forwardly extending frame bars underneath the rear of the tractor and pivotally connected with the latter for generally vertical swinging movement, tool means connected with the rear ends of said frame bars and including a transverse bar, said tractor having a transverse member adjacent its rear end, and lifting means including a pair of laterally spaced generally forwardly extending lifting arms carried by said transverse tool bar and movable into and out of engagement with said transverse member of the tractor for reacting against said latter member to raise the rear end of said implement frame.

22. A tractor propelled implement of the integral type, comprising a pair of laterally spaced generally longitudinally extending frame bars pivotally connected at their forward ends with the tractor forwardly at the rear end of the latter, a transverse member rockably mounted on said frame bars rearwardly of the tractor, a pair of arms fixed to said transverse member and rockable with the latter relative to said frame bars and the tractor, said arms extending generally forwardly in a position between said longitudinal frame bars, a part on the tractor disposed in a position at the rear thereof to be engaged by said arms when the latter are swung forwardly relative to the tractor, and means for swinging said arms downwardly into engagement with said part on the tractor for raising the rear end of the implement frame.

23. A tractor harrow of the integral type comprising a harrow frame adapted to be pivotally connected at its forward end to the tractor generally forward of the tractor seat, a pair of transversely disposed tooth bars rockably connected with the rear portion of said harrow frame adjacent to and below said tractor seat, an arm fixed to the central portion of each tooth bar and extending upwardly therefrom, a link extending in a generally longitudinal direction and connecting said tooth bar arms, a portion of said link being disposed in an upwardly and laterally outwardly inclined plane, a sector carried by said portion of the link and disposed in said plane, and an adjusting lever disposed generally in said plane and connected to rock said tooth bars, the upwardly and laterally outward disposition of said lever serving to cause the latter to clear said seat.

24. An implement comprising a frame, a pair of tool bars pivotally connected with said frame, an arm on each bar, a longitudinally extending member pivotally connecting the outer ends of said arms, an adjusting lever pivotally mounted on said member, a sector fixed to said longitudinally extending member and adapted to receive said adjusting lever in latched engagement therewith, and link means connecting said lever with said arm adjacent the pivot axis of the tool bar to which said arm is connected, whereby swinging movement of said lever swings both of said tool bars.

25. An implement comprising a frame, a pair of tool bars pivotally connected with said frame, an arm on each bar, a longitudinally extending member pivotally connecting the outer ends of said arms, an adjusting lever pivotally mounted on said member, a sector fixed to said longitudinally extending member and adapted to receive said adjusting lever in latched engagement therewith, and substantially inextensible link means connected at one end to said adjusting lever and at the other end to said one arm, the distance between the pivot of said adjusting lever and the point of connection of said link means therewith being appreciably less than the distance from the pivot between the outer end of said one arm and the longitudinally extending member to the point of connection between said link means and said one arm, whereby the effective leverage of said adjusting lever is increased.

CURTISS L. COOK.